UNITED STATES PATENT OFFICE.

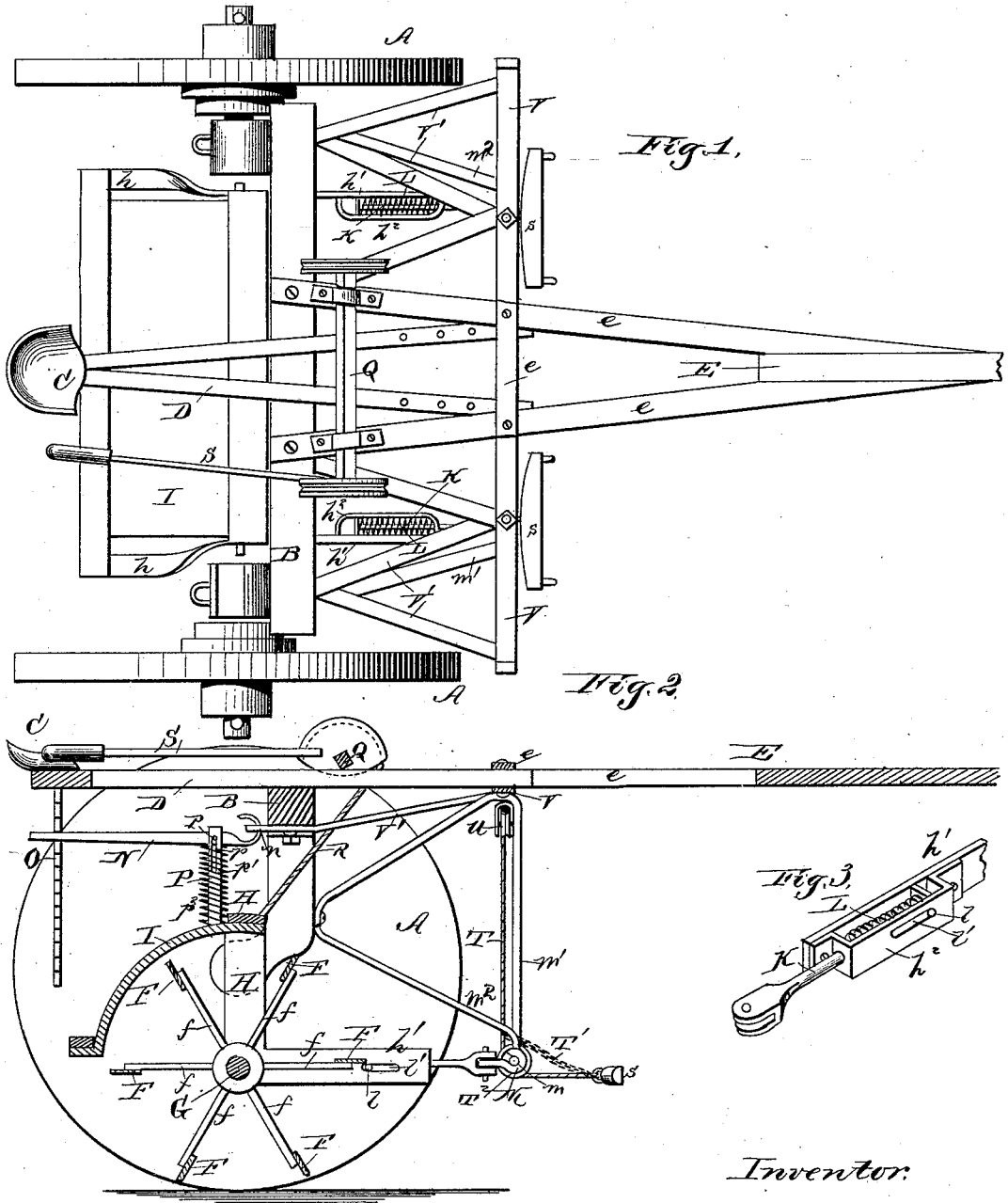

JOSEPH C. SEBRING, OF MILL CREEK TOWNSHIP, WABAUNSEE COUNTY, KANSAS.

STALK-CUTTER.

SPECIFICATION forming part of Letters Patent No. 245,978, dated August 23, 1881.

Application filed April 25, 1881. (No model.)

*To all whom it may concern:*

Be it known that I, JOSEPH C. SEBRING, of the township of Mill Creek, in the county of Wabaunsee and State of Kansas, have invented certain new and useful Improvements in Stalk-Cutters; and I do hereby declare that the following is a full, clear, and exact description thereof, reference being had to the accompanying drawings, and to the letters of reference marked thereon, which form part of this specification.

The object of this invention is to effect certain improvements in stalk-cutters.

The invention consists in the features of construction and combination hereinafter described and claimed, reference being had to the annexed drawings, in which—

Figure 1 is a plan view, Fig. 2 a central vertical section, and Fig. 3 a detail view of the draft-bar and its spring-connections.

A A indicate the supporting-wheels, and B the raised axle, the boxes of which are constructed in accordance with a prior invention of mine for which an application is now on file in the United States Patent Office. The frame of this machine is adapted to serve either as a frame for a cultivator or corn-planter or as a frame for a stalk-cutter, as in the present instance.

C indicates the driver's seat, that is secured upon the bars D, and E refers to the tongue or pole, secured by the hounds $e$ to the main frame of the machine.

The cutting-knives F are secured upon the radial arms $f f$ of the hubs, which are secured upon a rotary shaft, G. This shaft is mounted in a frame, H, the bars $h\ h$ of which support the shield I over the cutters, while the forwardly-projecting side bars, $h'\ h'$, of the same are provided at their forward ends with open boxes $h^2$. The draft-bars K extend into these boxes, and around their ends that are within the said boxes are arranged coiled springs L. The bars have pins $l$, that extend through slots $l'$ in the boxes, and as the said pins are at the rear ends of the springs the latter will be compressed by tension upon the cutters, thereby constituting yielding cushions for the same. These draft-bars are connected with the clevises M upon the pintles $m$, that are supported by the upright and the inclined bars $m'\ m^2$ of the frame of the machine. The draft-bars are detachably connected with the clevises, so that when it is desired to convert the machine into a cultivator or planter the draft-bars belonging to the stalk-cutter knives can be detached and similar bars belonging to the other said devices substituted.

N indicates a lever that is hooked into a staple, $n$, on the axle and brought into engagement with a vertical rack-bar, O, that is secured under the driver's seat. Connection is effected between this lever and the knife-frame by means of a pin, P, passing through the lever and through the slot $p$ of a bar, $p'$, that is connected with a staple upon the knife-frame, so as to constitute a flexible connection. A spring, $p^2$, is arranged around the bar $p'$ below the lever, to take up any shock and to make the connection yielding in its nature. The object of this lever is to force the knives to the required depth into the ground by throwing the weight of the carriage upon the knives.

Q refers to a shaft arranged in front of the driver's seat, and provided with two segments of sprockets. Chains or cords R R connect these sprockets with the knife-frame, and a lever, S, arranged within convenient reach of the driver, is employed for turning the said sprockets and shaft, in order to move the knife-frame and thus adjust the shield which said frame carries. These sprockets will be used when the cutters are removed and the machine converted into a cultivator or a planter.

The single-trees S S are connected with each other by means of the draft-chains T, having at each end a large loop, T', that encircles a pulley, T². These pulleys are mounted upon the pintles of the clevises before described. The chain passes up from its end loops and then across the machine transversely to the length of the latter, pulleys $u\ u$ being suspended from the main frame for the chain to pass over. By this means the draft will be effectively equalized. V indicates a cross-bar bolted to the hounds, and to this bar the upper ends of the vertical braces that rise from the clevises are secured. Braces V' also extend back from this bar to the axle, and preferably these braces are continuations of the aforesaid vertical braces.

Having thus described my invention, what I claim, and desire to secure by Letters Patent, is—

1. The combination, with the rotary knives and the knife-frame, of the bars $h'$, extending forward from said frame and provided with slotted open boxes, the hinged clevises M, the bars connected with said clevises and extending back into the slotted boxes, and the springs arranged around said bars within the boxes, substantially as and for the purpose described.

2. The combination, in a stalk-cutter, of the rotary knives, knife-frame, and shield-lever N, having spring-connection to the frame, and rack-bar O, arranged beneath the driver's seat, all substantially as and for the purpose set forth.

In testimony that I claim the foregoing as my own I affix my signature in presence of two witnesses.

J. C. SEBRING.

Witnesses:
EMILIE TREU,
SAUL BLANK.